United States Patent [19]
Lund et al.

[11] Patent Number: 5,834,743
[45] Date of Patent: Nov. 10, 1998

[54] INDUCTION HEATING APPARATUS AND METHOD FOR FUSING INTERCELL CONNECTORS TO BATTERY CELL TERMINALS

[75] Inventors: David L. Lund, Minneapolis, Minn.; Charles J. DiMarco, Kansas City, Mo.

[73] Assignee: GNB Technologies, Inc., St. Paul, Minn.

[21] Appl. No.: 752,059

[22] Filed: Nov. 19, 1996

[51] Int. Cl.$^6$ ............................... H05B 6/10; H01M 2/24
[52] U.S. Cl. .................. 219/633; 219/635; 219/603; 219/676; 219/632; 228/180.1; 29/623.2; 29/623.4; 425/174.8 R
[58] Field of Search ................... 219/633, 635, 219/603, 604, 674, 676, 677, 632; 228/179.1, 180.1; 29/623.1, 623.2, 623.4; 264/403; 425/174.8 R, 774

[56] References Cited

U.S. PATENT DOCUMENTS

| | | | |
|---|---|---|---|
| 3,544,754 | 12/1970 | Buttke et al. ............................. | 219/79 |
| 3,589,948 | 6/1971 | Adams .................................. | 29/623.1 |
| 3,836,401 | 9/1974 | Niklas et al. . | |
| 3,909,300 | 9/1975 | Schenk, Jr. et al. . | |
| 3,960,602 | 6/1976 | Schenk, Jr. et al. . | |
| 4,152,566 | 5/1979 | Magerle ............................... | 219/633 |
| 4,155,000 | 5/1979 | Jenzano . | |
| 4,355,222 | 10/1982 | Geithman et al. .................... | 219/635 |
| 4,376,156 | 3/1983 | Wheadon . | |
| 4,501,943 | 2/1985 | Lund .................................... | 219/633 |
| 4,573,260 | 3/1986 | Mullane et al. ...................... | 29/623.1 |
| 4,675,991 | 6/1987 | Byers . | |
| 4,724,190 | 2/1988 | Siga et al. . | |
| 5,202,198 | 4/1993 | Mix et al. ............................. | 429/160 |
| 5,350,902 | 9/1994 | Fox et al. ............................. | 219/633 |

*Primary Examiner*—Philip H. Leung
*Attorney, Agent, or Firm*—Leydig, Voit & Mayer, Ltd.

[57] ABSTRACT

An apparatus and method for fusing intercell connectors to battery cell terminal posts. The apparatus includes inexpensive, non-metallic molds, each having a mold opening and being positionable onto a connector with the mold opening in aligned relation to a terminal post positioned in a connector opening for defining a mold cavity adjacent an end of the terminal post and the connector opening. A selectively positionable induction heating head is provided for locating an induction heating coil in predetermined spaced relation to a terminal post and connector to be fused such that generation of a high frequency, oscillating current in the coil causes melting and fusion of the terminal post and connector with the mold retaining and forming the molten lead. The induction heating head may be manually positionable for use with batteries with different post locations and orientations and includes safety and position locating features.

41 Claims, 5 Drawing Sheets

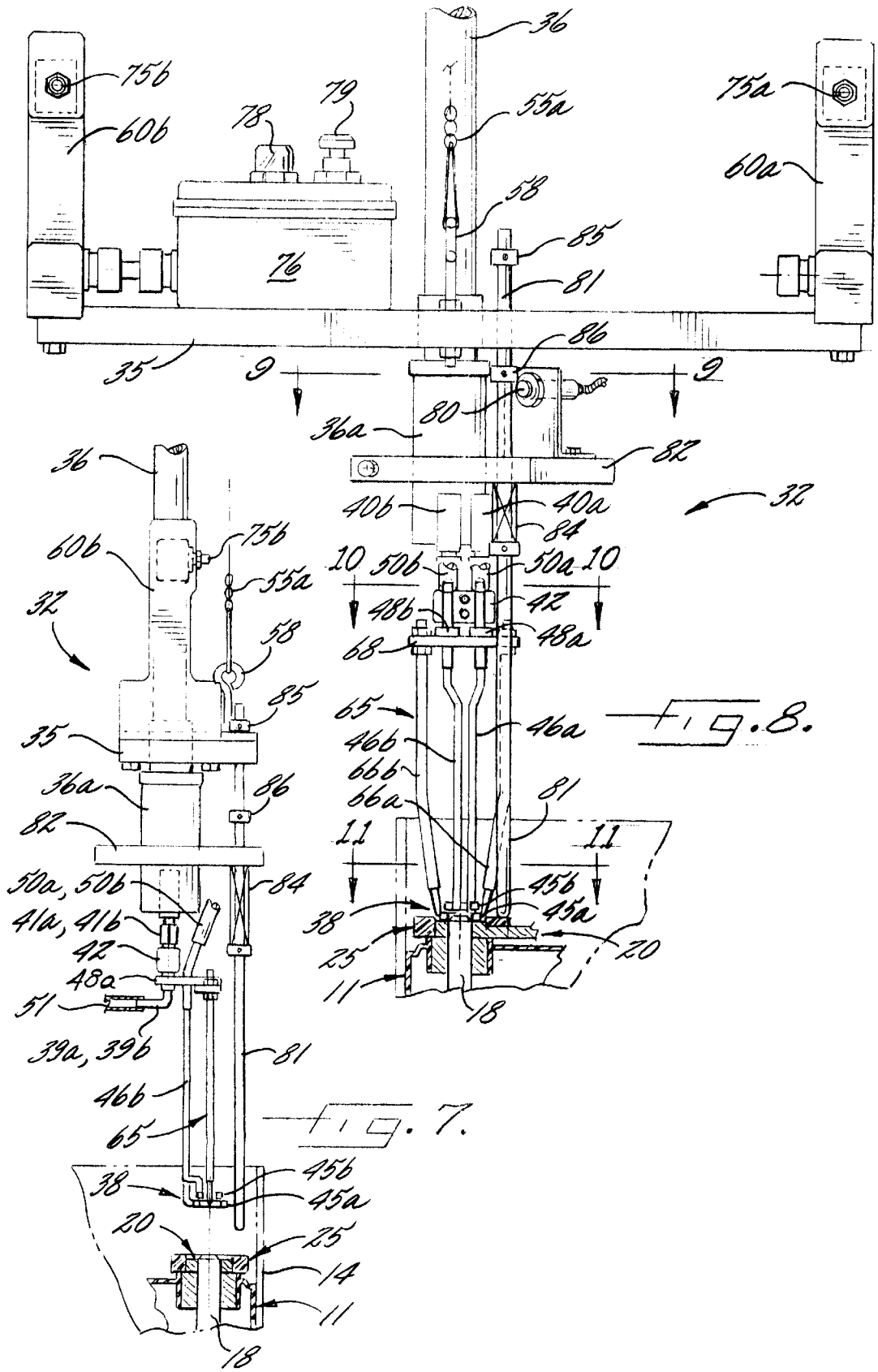

INDUCTION HEATING APPARATUS AND METHOD FOR FUSING INTERCELL CONNECTORS TO BATTERY CELL TERMINALS

FIELD OF THE INVENTION

The present invention relates generally to the manufacture of lead acid storage batteries, and more particularly, to a method and apparatus for bonding intercell connectors to the terminals of battery cells.

BACKGROUND OF THE INVENTION

Large industrial and motive power lead acid storage batteries typically are manufactured in small lots in a job shop type environment. Such batteries commonly comprise a plurality of individually fabricated battery cells supported in a common tray and interconnected in series by strap-like intercell connectors. Various of the manufacturing steps, including bonding of intercell connectors to terminals of the battery cells, is inherently slow and labor intensive.

A common method of attaching intercell connectors to the terminals has involved positioning a pre-cast lead connector over a pair of terminals to be connected, locating metal molds about the terminal posts and connector and hammering the molds in place, melting the lead connector and terminal posts by means of a manually held acetylene torch and allowing the lead to cool, re-melting and dressing the fused joints to improve appearance and again allowing the lead to cool, and then removing the metal mold. Not only does such manual torch burning fail to lend itself to use in automated battery production lines, the procedure can create a hazard to the environment of the worker, requires manual handling of hot metal molds, and cannot be carried out with consistent quality. Indeed, although the finished connection may have a good appearance, it is not easily determinable whether reliable bonding and fusion have been achieved.

While proposals have been made for the automated bonding of cell connectors to battery terminal posts, these proposals have not lent themselves to small lot battery production of different sized batteries. Relatively expensive precision molds are required, and lengthy change-over times make conventional automated manufacturing methods impractical in small lot production.

Although bonding lead components by means of induction heating has found desirable application in the production of lead acid storage batteries, such procedures heretofore have not been utilized in the manufacture of large industrial and motive power batteries, which typically have required extensive manual handling. The high voltage necessary for induction heating has precluded handling and manipulation of the induction heating devices. In addition to safety considerations, it has not been considered feasible to achieve consistent and uniform fusion of lead components by means of manually held and operated induction heating devices. The necessity for water cooling the induction heating coils during usage also limit transport and handling of such devices.

OBJECTS AND SUMMARY OF THE INVENTION

It is an object of the invention to provide an apparatus and method for fusing intercell connectors to battery terminal posts that can be efficiently operated and carried out in small lot battery production in a job shop environment.

Another object is to provide an apparatus and method as characterized above which eliminates the need for high cost molds and the handling and removal of hot metal molds. A related object is to provide such an apparatus and method which employs inexpensive, non-metallic molds that may remain a decorative component of the battery during its service life.

A further object is to provide an apparatus and method of the above kind which can utilize the advantages of induction heating. A related object is to provide a selectively positionable induction heating device that can be safely and efficiently used in small lot production of different sized batteries.

Yet another object is to provide such a selectively positionable induction heating apparatus that is operable for reliably fusing connectors and battery cell terminals to substantially uniform fusion depths.

Other objects and advantages of the invention will become apparent upon reading the following detailed description and upon reference to the drawings, in which:

BRIEF DESCRIPTION OF THE DRAWINGS

FIG. 7 is an enlarged side elevational view of the induction heating coil supporting head of the illustrated apparatus as it is being moved into operative position with a terminal post and intercell connector to be fused;

FIG. 8 is a front elevational view of the induction heating coil supporting head shown in FIG. 7, upon positioning thereof into operative relation to a battery cell terminal post and intercell connector to be fused.

DETAILED DESCRIPTION OF THE PREFERRED EMBODIMENT

Figure 1:
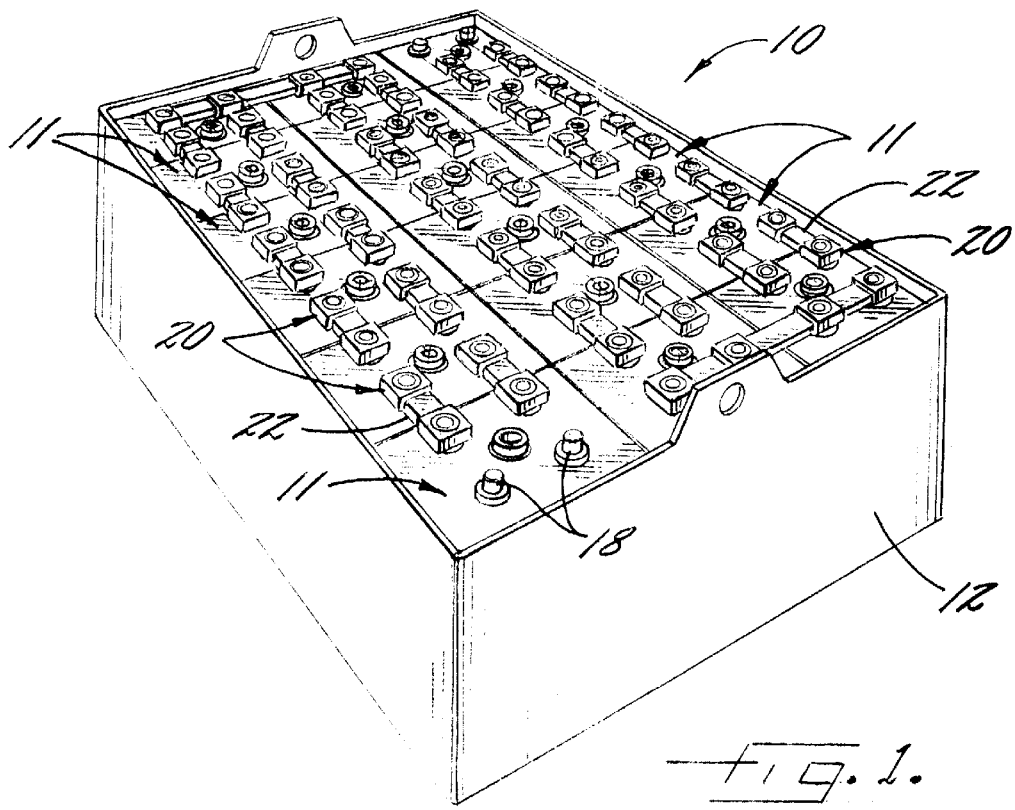
FIG. 1 is the perspective of a lead acid storage battery having a plurality of battery cells with intercell connectors fused to terminals by the inducting heating apparatus and method of the present invention.
Figure 2:
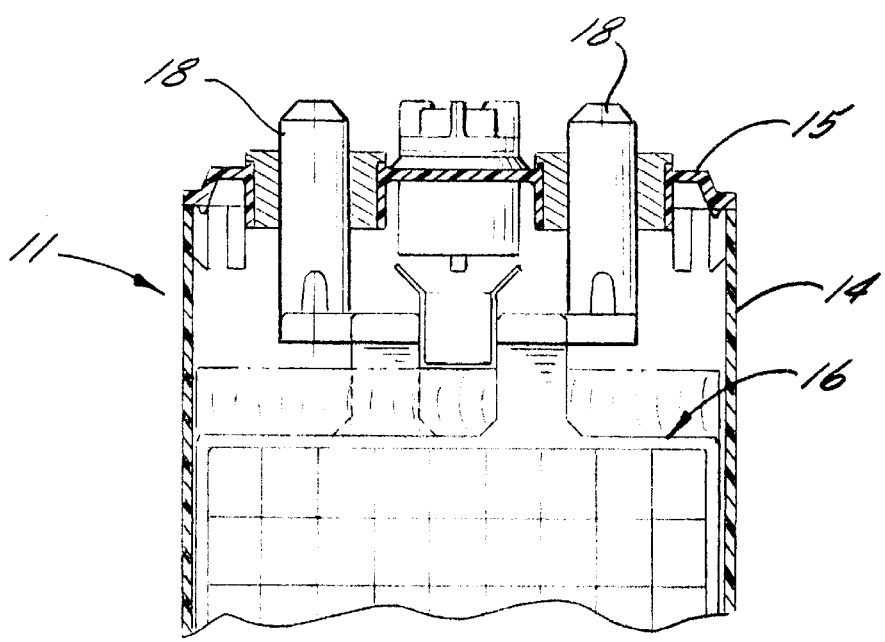
FIG. 2 is an enlarged fragmentary section of one of the cells of the illustrated battery.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particular to the drawings, there is shown an illustrative industrial or motive power battery 10 which comprises a plurality of lead acid storage battery cells 11 supported in a common tray 12. The battery cells 11 may be of a conventional type each comprising a plastic container 14, commonly referred to as a jar, having a cover 15 for housing a group 16 of positive and negative battery plates, with the battery plates each being connected to a respective terminal post 18 of common plurality that extends upwardly through the cover 15. It will be understood that the battery cells 11 may be a flooded, unsealed type, or alternatively, a valve regulated, sealed design. In either case, the terminal posts 18 extend in sealed relation to the cover.

For electrically interconnecting the battery cells 11, intercell connectors 20 extend between the terminal posts 18 of adjacent battery cells 11. The intercell connectors 20 bridge the space and couple terminal posts 18 of opposite polarity in adjacent cells 11, i.e. the positive post of one cell being coupled to the negative post of an adjacent.

Figure 3:
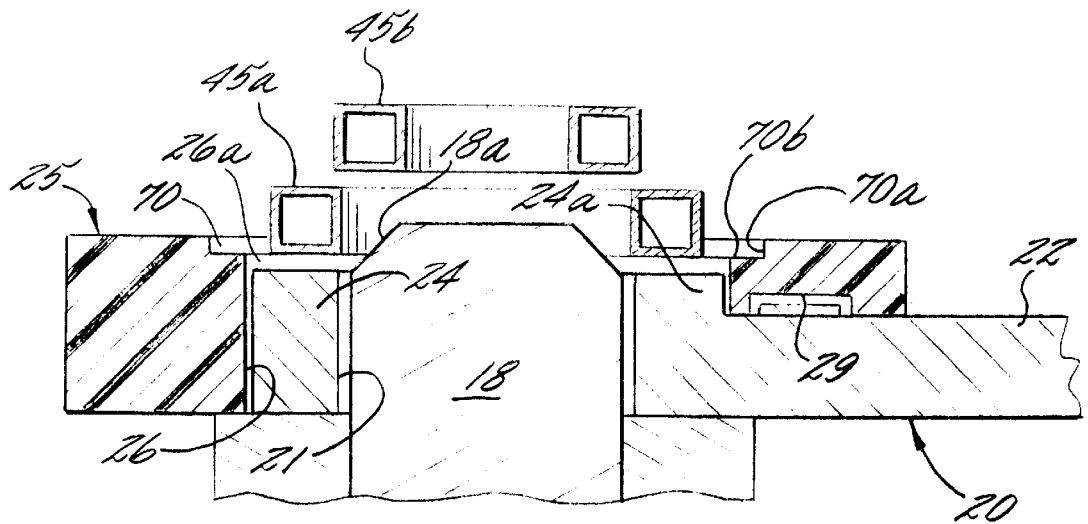
FIG. 3 is a fragmentary vertical section showing a battery cell with an intercell connector positioned on a terminal thereof and being operatively located with respect to the illustrated apparatus, prior to fusing of the connector and the terminal post.
Figure 4:
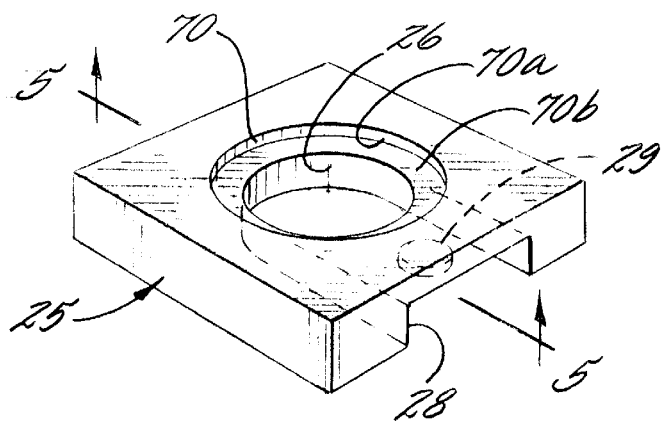
FIG. 4 is a perspective of a mold utilized with the illustrated apparatus during an induction heating and fusing operation.
Figure 5:
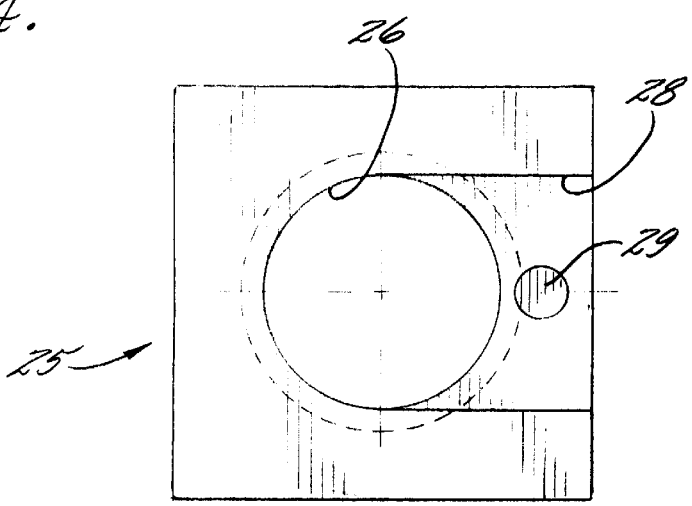
FIG. 5 is the bottom view of the mold shown in FIG. 4.

The battery components particularly suited for use in accordance with the present invention are illustrated in FIGS. 3–5. The intercell connectors 20 have an elongated configuration formed with openings 21 at opposite ends each adapted for positioning over and receiving a respective battery cell terminal post 18. The illustrated connectors 20 have a central strap portion 22 and end sections 24 formed with a respective one of the openings 21. The end sections 24 in this case extend above the upper surface of the strap portion 22 for defining a raised annular collar 24a, as shown in FIG. 3. The illustrated posts 18 each terminate in a chamfered upper end 18a that extends slightly above the collar 24a of a connector 20 positioned over the post.

In accordance with the invention, the intercell connectors are fused to the terminal posts by an induction heating process utilizing inexpensive, non-inductive molds. To this end, in the illustrated embodiment, molds 25, preferably made of a rigid plastic material, such as polypropylene or a glass impregnated phenolic, are provided for positioning over each terminal post 18 and connector 20 to be fused. The mold 25 in this case has a substantially square configuration formed with a central opening 26. When the mold 25 is positioned on the connector 20, as shown in FIG. 3, the mold opening 26 defines a cylindrical mold cavity 26a that extends a distance above the upper perimeter of the annular collar 24a of the connector 20.

To facilitate proper aligned positioning of the mold 25 onto and over the connector 20 and terminal post 18, the mold opening 26 is just slightly larger in diameter than the upstanding connector collar 24a diameter of the post 18 about which it is positioned and the underside of the mold 25 is formed with a channel 28 communicating between a side of the opening 26 and one side of the mold for defining a U-shaped saddle that is positionable over the strap portion 22 of the connector. The illustrated channel 28 (FIG. 5) has a width corresponding substantially to the diameter of the mold opening 26 and the width of the intercell connector strap portion 22. Such saddle mounting of the mold 25 enables the mold to be mounted on the connector 20, regardless of the orientation of the connector 20 relative to an adjacent battery cell 11. An annular recess 29 in this case is formed in an underside of the mold 25 for receiving a polarity indicator, i.e. a "plus" or "minus" sign, molded in upstanding relation to the strap portion 22.

Figure 6:
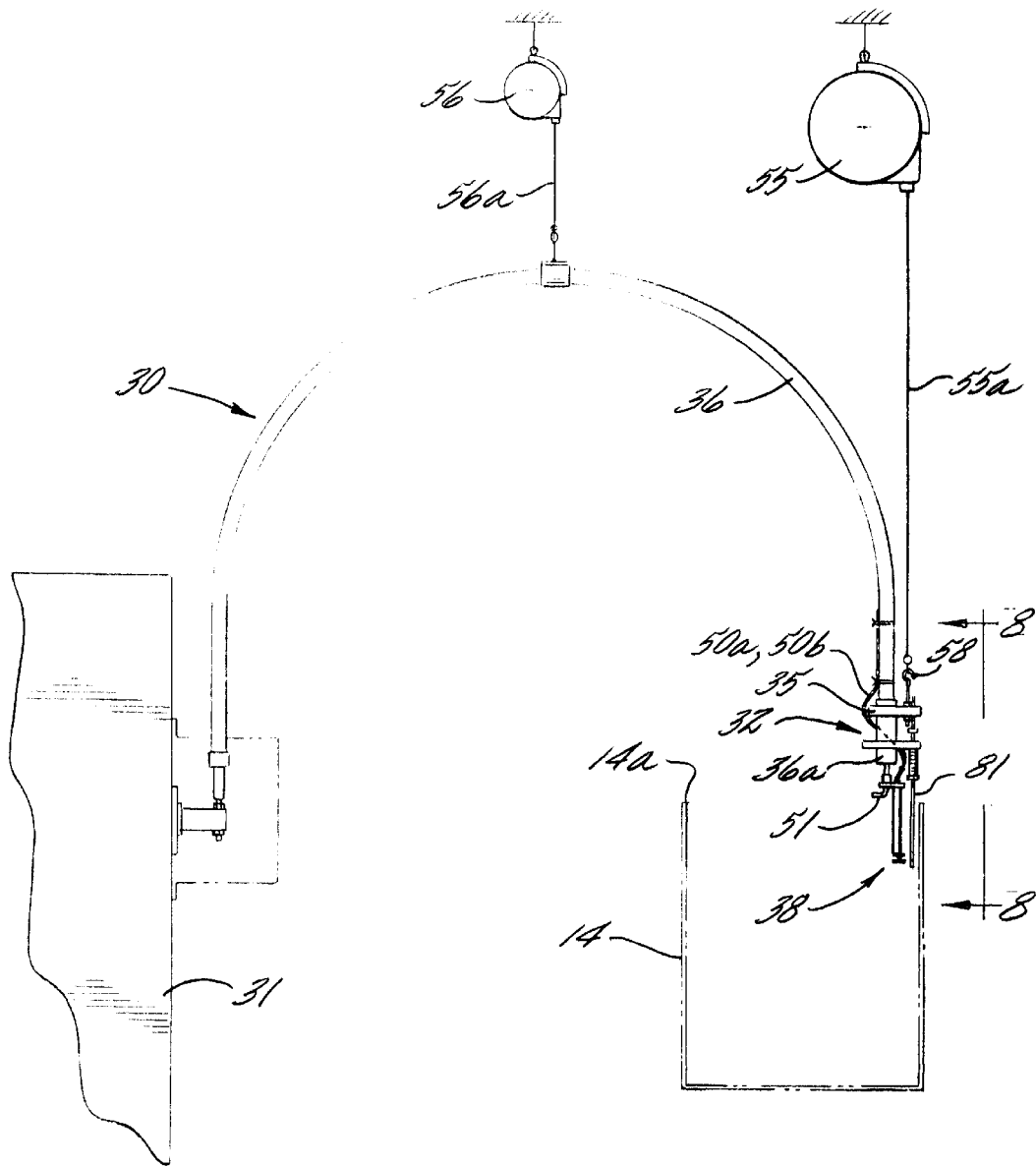
FIG. 6 is a side elevation view of the illustrated induction heating apparatus.
Figure 9:
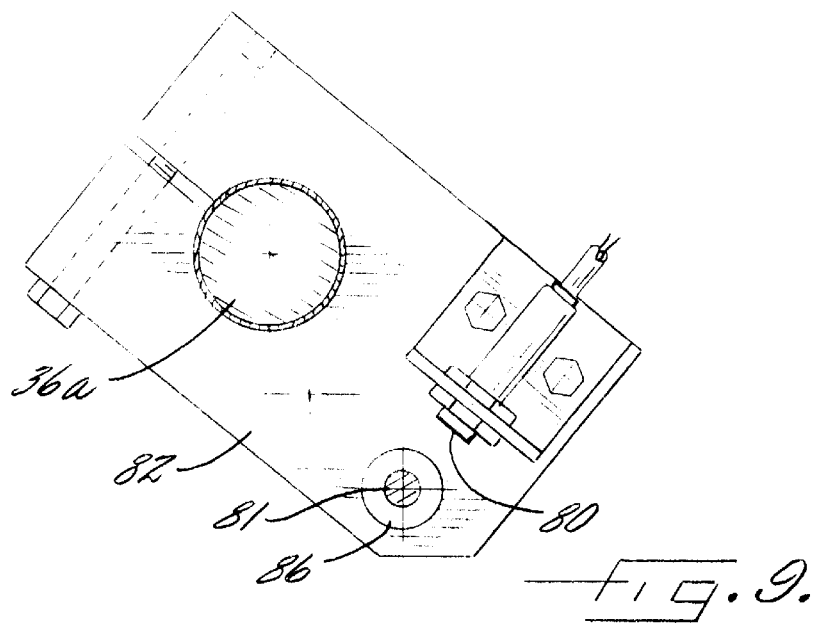
FIGS. 9–11 are horizontal sections taken in the planes 9—9, 10—10, and 11—11, respectively, in FIG. 8.
Figure 10:
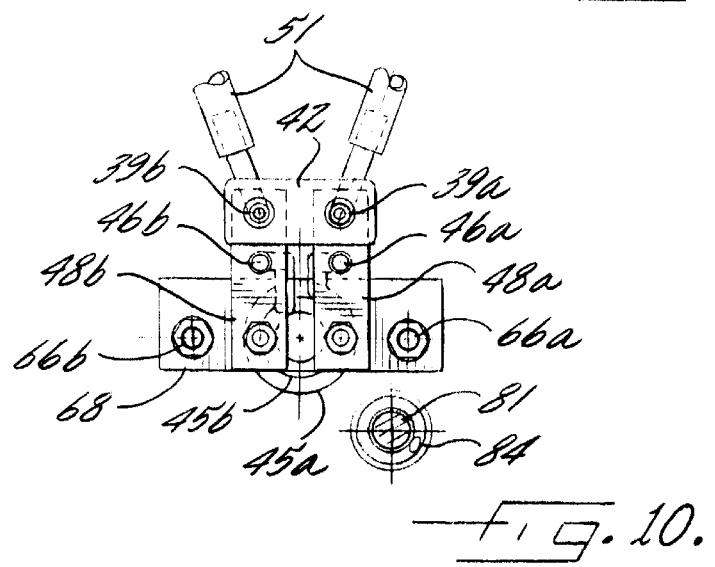
Figure 11:
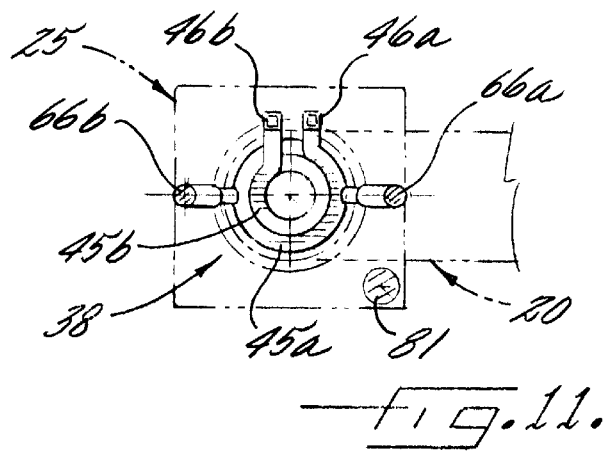

In accordance with an important aspect of the invention, a selectively positionable induction heating apparatus 30 is provided that is operable with the plastic molds 25 in place for efficiently and reliably fusing the intercell connectors 20 and terminal posts 18 even when processing small lots of different sized batteries. The illustrated induction heating apparatus 30, as shown in FIG. 6, comprises an induction heating generator 31 and a selectively positionable coil supporting head 32 that can be easily and safely used with battery cells of various configurations and heights. The generator 31 may be a conventional high voltage type, for example, having 30 kilowatt capacity at 450 kHz.

The head 32 includes a base plate 35 fixed adjacent the end of a flexible coaxial cable 36 extending from the generator 31 and an induction heating coil 38 supported in depending fashion from the base plate 35. For supporting and electrically communicating with the coil 38, the coaxial cable 36 has an end section 36a depending from an underside of the base plate 35. The coaxial cable end section 36a in turn is connected to the upper ends of copper tubing sections 39a, 39b by connecting tubes 40a, 40b and compression ferrules or fittings 41a, 41b that provide watertight electrical couplings. To stabilize the copper tubing sections 39a, 39b, an insulating block 42 physically connects the tubing sections 39a, 39b at a location immediately below the compression fittings 41a, 41b, as shown in FIG. 7.

The induction heating coil 38 is defined by an endless length of copper tubing which in this case is formed with two vertically spaced annular turns 45a, 45b and a pair of upright, leg sections 46a, 46b. In the illustrated embodiment, the lower coil turn 45a has an inner diameter corresponding substantially to the inner diameter of the connector openings 21 and the upper coil turn 45b is slightly smaller in diameter.

For supporting and electrically connecting the induction heating coil 38 to the copper tubular sections 39a, 39b, a pair of conductive plates 48a, 48b are fixed to and extend in cantilever fashion from the tubular sections 39a, 39b. The leg sections 46a, 46b of the coil 38 are fixed near their upper ends to the plates 48a, 48b with the coil turns 45a, 45b suspended below. As will be understood by one skilled in the art, energization of the generator 31 will create high frequency current flow through the coaxial cable 36, the conductive tubular sections 39a, 39b, the conductive plates 48a, 48b, and coil 38, inducing high voltage heating effects of inductive materials located in axial relation to the coil turns 45a, 45b.

To cool the induction heating apparatus 30 during a heating cycle, three independent cooling circuits are provided which each communicate with a common cooling water source at the generator 31. For cooling the induction heating coil 38, one cooling circuit includes cooling water supply and return hoses 50a, 50b connected to and communicating with upstanding ends of the induction heating coil leg sections 46a, 46b. The supply and return lines 50a, 50b in this case extend along and are fixed to the outer perimeter of the coaxial cable 36 from the induction heating coil supporting head to the cooling water supply. For cooling the coaxial cable 36, a second cooling water circuit communicates from the cooling water supply through the coaxial cable 36, the copper tubing section 39a, a flexible hose 51 connected between out turned ends of the copper tubing sections 39a, 39b, and then back through the copper tubing section 39b and coaxial cable 36 to the water supply. A third water cooling circuit is located within and dedicated entirely to the generator 31.

In keeping with the invention, for enabling selective horizontal and vertical positioning of the head 32 and induction heating coil 38 supported thereby relative to battery cells being processed, the head 32 and the coaxial cable 36 are supported by respective extendable and retractable suspension lines 55a, 56a of ceiling mounted return spools 55, 56. The return spools 55, 56 may be pneumatic balancers of a conventional type, which permit extension and retraction of the suspension lines 55a, 56a while enabling the lines to support the head 32 and cable 36 at any desired position. The suspension line 55a of the pneumatic balancer 55 in this instance is secured to an eyebolt 58, which in turn is connected to the head base plate 35. The suspension line 56a for the pneumatic balancer 56 is connected to a collar 59 disposed about the coaxial cable 36 intermediate its ends.

To facilitate manual positioning of the head 32, upstanding handles 60a, 60b are fixed at opposite ends of the head base plate 35. It will be seen that an operator may manually grasp the handles 60a, 60b to position the head 32 such that the turns 45a, 45b of the induction heating coil 38 are in operative relation to a connector 20 and terminal post 18 to be fused, with the pneumatic balancers 55, 56 enabling such movement. With the induction heating coil turns 45a, 45b supported in depending relation from the coil leg sections 46a, 46b, the induction heating head 32 may be positioned to locate the coil turns 45a, 45b in operative relation to battery cell terminal posts 18 and connectors 20 even when located in recessed relation to an upper end 14a of a tray or container 14, such as depicted in FIG. 6.

In carrying out the invention, to enable precise and repeatable positioning of the induction heating coil 38 relative to battery terminal posts 18 and intercell connectors 20 to be fused, the head 32 has a locator device 65 supported adjacent the induction heating coil 38 for cooperative engagement with molds 25 positioned on the intercell connectors 20 and terminal posts 18 to be connected. The locator device 65 in this instance comprises a pair of elongated, laterally spaced locating studs 66a, 66b supported in depending fashion from a stud board 68 secured by appropriate insulated mountings to the underside of the cantilevered plates 48a, 48b. The studs 66a, 66b are disposed in outwardly spaced relation to the induction heating coil legs 46a, 46b, as viewed in FIG. 8, and extend downwardly to a level slightly above the bottom periphery of the lower coil turn 45a.

For enabling precise positioning of the locator studs 66a, 66b relative to the connector 20 and terminal post 18 to be fused, the upper side of each mold 25 is formed with a locating recess or counter-bore 70 (FIG. 4) coaxial with the mold opening 26 and of a diameter corresponding substantially to the lateral spacing of the studs 66a, 66b. The recess 70 defines an annular vertical locating wall or surface 70a and a horizontal locating wall or surface 70b. It will be seen that by positioning the head 32 with the locating studs 66a, 66b in the counter-bore 70 of the mold 25, the vertical locating surface 70a precisely orients the induction heating coil turns 45a, 45b in the horizontal or X-Y plane relative to the terminal post 18 and connector 20 and the horizontal locating surface 70b orients the induction heating coil turns in the vertical or Z direction.

With the induction heating coil turns 45a, 45b located in predetermined spaced relation to the upstanding terminal post 18 and the annular collar 24a of the connector, as depicted in FIG. 3, high frequency alternating electric current through the coil 38 upon energization of the generator 31 will melt and fuse the top portions of the terminal post 18 and connector 20 with the mold retaining and forming the molten lead. In the illustrated embodiment, the chamfered upper end 18a of the terminal post and the adjacent collar 24a of the connector will melt and fuse, forming an integral bond with a substantially flat upper surface and a well defined perimeter as established by the mold cavity 26a. During an induction heating cycle, impurities such as lead oxide often trapped in the lead battery components during casting will float up and out of the fusion zone by virtue of the vibrations caused by induction heating, thus creating a high quality fused connection. Such heating, melting and fusion of the terminal post 18 and connector 20 usually takes no more than about four seconds and can be controlled to achieve reliable, substantially uniform fusion depths of between about one-quarter and three-eighths inch without melting or otherwise damaging the plastic mold 25.

Precise positioning of the coil turns 45a, 45b in the vertical or Z direction relative to the connector collar 24a and terminal post 18 as established by the locating studs 66a, 66b and the horizontal locating surface 70b of the mold recess 70, has been found to be critical in achieving reliable bonding of terminal posts and connectors to uniform fusion depths on a repeatable basis. As a result, even when manual handling and positioning of the induction heating head 32, the locating studs 66a, 66b and mold locating recesses 70 enable uniform and reliable fusion to be effected between intercell connectors and terminal posts of various sized and configured battery cells.

To ensure that the hands of the operator are safely out of the vicinity of the induction heating coil 38 during energization of the coil, the induction heating apparatus 30 has a pair of thumb operated start buttons 75a, 75b each located on a respective one of the handles 60a, 60b which, through appropriate circuitry, must both be actuated to initiate a heating cycle. The induction heating head 25 in this case has an electrical box 76 located on the base plate 35 intermediate the handles which includes a "heat on" light 78 that is energized during an induction heating cycle. An emergency stop button 79 is located adjacent the "heat on" light.

As a further safety feature, the head 32 includes a further enabling switch, which in this case is in he form of a proximity switch 80, for ensuring that the locating studs 66a, 66b and induction heating coil 38 are properly positioned before start of a heating cycle. The switch 80 has an elongated actuating rod 81 supported for relative vertical movement by the base plate 35 and a mounting plate 82 fixed to the coaxial cable end section 36a. For biasing the actuator rod 81 in a downward direction, a spring 84 is interposed between the mounting plate 82 and a stop collar 85 fixed to the actuator rod 81.

Upon positioning of the locating studs 66a, 66b into the locating recess 70 of the mold 25 prior to a heating cycle, the actuator rod 81 will engage the mold and be forced in an upward direction against the biasing force of the spring 84 (FIG. 7). Only upon complete retraction of the actuator rod 81 incident to positioning of the locating studs 66a, 66b into contacting relation with the bottom surface 70b of the mold recess 70 will a collar 86 mounted adjacent an upper end of the rod 81 be sensed by the proximity switch 80. Hence, by appropriate circuitry, it is only upon actuation of the enabling switch 80 incident to sensing full retraction of the rod 81 and manual actuation of the handle thumb switches 75a, 75b that a heating cycle can be carried out.

Upon completion of a heating cycle and without the necessity for releasing the handles 60a, 60b of the coil supporting head 25, an operator may reposition the head 25 to the next terminal post 18 to be fused where the locating studs 66a, 66b are again positioned into the locating recess 70 of the mold 25 and the induction heating coil 38 energized by dual actuation of the handle mounted switches 75a, 75b. Upon completion of the induction heating cycle, the fused post and connector will quickly solidify, and the inexpensive plastic mold 25 may be either removed or be left as a decorative component of the completed battery. In either case, the mold may remain in place during cooling of the battery post and connector and there is no necessity for removing and handling hot metal molds typical of the prior art.

From the foregoing, it can be seen that the apparatus and method of the present invention are effective for efficiently and reliably fusing intercell connectors to battery terminal posts even in small lot battery production in a job shop environment. The invention eliminates the need for high cost molds and the handling and removal of hot metal molds. The invention further permits the advantageous use of induction heating for melting and fusing the terminal connectors to uniform fusion depths, with the induction heating apparatus being selectively positionable to accommodate batteries with different post locations and orientations. While the coil supporting head in the illustrated embodiment is manually positionable, it will be understood by one skilled in the art that alternatively automatic positioning means may be provided. Such means, for example, may take the form of positioning arms or robots which are programmed or operated to locate the coil supporting head for specific battery configurations.

What is claimed is:

1. An apparatus for fusing battery cell connectors having openings at opposite ends to battery cell terminal posts positioned in the connector openings comprising an induction heating device, a non-inductive mold separate and apart from said inducting heating device and having an opening; said mold being positioned on a connector in surrounding relation to an end portion of the connector with the opening therein in aligned relation to a terminal post positioned in the connector opening for defining a mold cavity adjacent an end of said terminal post and connector opening; said induction heating device including an induction heating coil; said coil defining at least one annular turn disposed in predetermined spaced apart relation to the terminal post positioned in the connector opening; and a selectively energizable induction heating generator for creating a high frequency, oscillating current in said coil for melting and fusing by induction heating portions of the predetermined spaced apart terminal post and the connector with the mold retaining and forming the melted and fused portions.

2. The apparatus of claim 1 in which said mold has a locating recess in an upper side thereof, and said induction heating device has a locator disposed in adjacent relation to said coil for cooperative engagement with said mold locating recess for establishing predetermined relative positioning of the coil and the terminal post and connector to be fused.

3. The apparatus of claim 2 in which said locator includes a pair of studs supported in adjacent relation to said coil.

4. The apparatus of claim 3 in which said locating recess defines horizontal and vertical locator surfaces.

5. The apparatus of claim 2 in which said locating recess is a counter bore formed in said mold concentrically with said mold opening.

6. The apparatus of claim 1 in which said mold is formed with a U-shaped channel on its underside for straddling the connector upon which it is positioned.

7. The apparatus of claim 6 in which said mold channel has a width corresponding substantially to the diameter of the mold opening and communicates between a side of the mold opening and an outer peripheral side of the mold.

8. The apparatus of claim 6 in which said mold is formed with a recess in an underside thereof for receiving an upstanding polarity indicator on said connector.

9. The apparatus of claim 1 in which said coil defines two vertically spaced annular turns, with the lowermost turn having an inner diameter corresponding substantially to the inner diameter of the connector opening in which the terminal post is positioned and the upper turn being of smaller diameter.

10. The apparatus of claim 1 in which said mold has a substantially square configuration with said mold opening being centrally located.

11. The apparatus of claim 1 in which said mold is removable from the connector following fusion of the terminal post and connector.

12. The apparatus of claim 1 in which each said connector is formed with an upstanding collar about each collar opening, and said mold opening is sized for predetermined aligned positioning over said collar.

13. An apparatus for fusing battery cell connectors having openings at opposite ends to battery cell terminal posts positioned in the connector openings comprising an induction heating device having a head, an induction heating coil supported in depending relation to said head; said coil defining at least one annular turn; said head being selectively positionable to locate said coil turn in predetermined spaced relation to a terminal post positioned in a connector opening; a selectively energizable induction heating generator remote from said head for creating a high frequency, oscillating current in said coil for melting and fusing by induction heating portions of the predetermined spaced apart terminal post and the connector; said head being disposed at the end of a flexible coaxial cable which electrically connects said coil to said generator, and said cable being suspended from an overhead support to permit manual positioning of the head and the coil supported thereby with respect to the battery terminal post and connector.

14. The apparatus of claim 13 in which said head includes a base with a pair of upstanding handles for enabling manual positioning of the induction heating coil relative to a battery terminal post and connector to be fused.

15. The apparatus of claim 14 in which each said handle has a respective switch which must be actuated to enable energization of said generator.

16. The apparatus of claim 13 in which said head and cable are supported for selected movement by at least one ceiling mounted extendable and retracted suspension line.

17. The apparatus of claim 16 in which said ceiling mounted suspension line is supported for extendable and retractable movement from a spool.

18. The apparatus of claim 13 in which said head includes a base having handles mounted in upstanding relation at opposite ends thereof for manually positioning the induction heating coil relative to the battery terminal post and connector to be fused, and said cable is connected to said base at a central location intermediate said handles.

19. The apparatus of claim 13 in which said coil is defined by an uninterrupted conductive tubing which defines said at least one annular turn and upstanding leg sections extending from said turn, and said coil leg sections being supported and electrically connected to said coaxial cable.

20. The apparatus of claim 19 in which said head includes a base connected adjacent an end of said coaxial cable, conductive tubular members electrically connected to said coaxial cable and extending in depending relation to said base, and said coil leg sections being supported by and electrically connected to said conductive tubular members.

21. The apparatus of claim 20 in which said coil leg sections are supported by respective conductive plates fixed in cantilever relation to said conductive tubular members.

22. The apparatus of claim 20 including a cooling water supply, and said coaxial cable and conductive tubular members forming at least part of a coaxial cable cooling water circuit communicating with said cooling water supply.

23. The apparatus of claim 22 including cooling water supply and return lines respectively connecting said coil leg sections with said cooling water supply, and said coil and supply and return lines forming at least part of a coil cooling circuit communicating with said cooling water supply separate from said cable cooling water circuit.

24. An apparatus for fusing battery cell connectors having openings at opposite ends to battery cell terminal posts positioned in the connector openings comprising an induction heating device, a non-inductive mold separate and apart from the induction heating device and having an opening; said mold being positioned on a connector with the mold opening therein in aligned relation to a terminal post positioned in the connector opening for defining a mold cavity adjacent an end of said terminal post and connector opening; said induction heating device including a head having an induction heating coil; said coil defining at least one annular turn; said head being selectively positionable to locate said coil turn in predetermined relation to said mold and a terminal post positioned in the connector opening; and a selectively energizable induction heating generator for creating a high frequency, oscillating current in said coil for melting and fusing by induction heating portions of the predetermined spaced apart terminal post and the connector with the mold retaining and forming the melted portions.

25. The apparatus of claim 24 in which said coil is supported in depending relation to said head.

26. The apparatus of claim 25 in which said head includes a base with a pair of upstanding handles for enabling manual positioning of the induction heating coil relative to a battery terminal post and connector to be fused, each said handle having a respective switch which must be actuated to enable energization of said generator, said head having a further enabling switch which must be actuated together with said handle switch for enabling energization of said generator, and said further enabling switch being actuatable in response to positioning of said induction heating coil into predetermined position with respect to said mold, terminal post, and connector.

27. The apparatus of claim 26 including a vertically moveable switch actuating rod supported by said head in adjacent relation to said coil, said actuating rod being engageable with said mold and retractable relative to said head upon positioning of said coil into predetermined operative relation to a terminal post and connector to be fused, and said further enabling switch being actuated in response to retraction of said rod to a predetermined position.

28. The apparatus of claim 24 in which said head is disposed at the end of a flexible coaxial cable which electrically connects said coil to said generator.

29. The apparatus of claim 24 in which said mold has a locating recess in an upper side thereof, and said head has a locator disposed in adjacent relation to said coil for cooperative engagement with said mold locating recess for establishing predetermined relative positioning of the coil and the terminal post and connector to be fused.

30. The apparatus of claim 29 in which said coil and locator both extend in depending relation from said head, said locator having a lower end that is engageable with said mold for establishing predetermined positioning of said coil and the terminal post and connector to be fused, and said coil turn having a lower periphery disposed below the level of said lower locator end.

31. The apparatus of claim 29 in which said locating recess defines horizontal and vertical locator surfaces.

32. The apparatus of claim 31 in which said mold is formed with a U-shaped channel on its underside corresponding substantially to the width of the connector for straddling a portion of the connector upon which it is positioned.

33. A method of fusing intercell connectors having openings in opposite ends to battery cell terminal posts positioned in the connector openings comprising the steps of providing a non-metallic mold having an opening therein, positioning the mold over a connector with the mold opening in aligned relation to a terminal post positioned in a connector opening for defining a mold cavity adjacent the end of the terminal post and the connector opening, providing an induction heating coil separate and apart from the mold and having at least one annular turn disposed in predetermined relation to said mold and the terminal post positioned in the connector opening, and creating a high frequency oscillating current in the coil for melting and fusing by induction heating portions of the predetermined spaced apart terminal post and the connector with the mold retaining and forming the melted portions.

34. The method of claim 33 including selectively positioning said coil in predetermined spaced relation to a terminal post and connector to be fused.

35. The method of claim 33 including selectively positioning the induction heating coil over the terminal post in one opening of the connector, creating a high frequency oscillating current in the coil for melting and fusing the terminal post and connector, selectively positioning the coil over the terminal post in the other opening of the connector, and creating a high frequency oscillating current in the coil for melting and fusing the terminal post positioned in the other connector opening.

36. The method of claim 33 including supporting the induction heating coil at the end of a coaxial cable connected to an induction heating generator, selectively positioning the induction heating coil and coaxial cable such that the coil turn is concentrically disposed relative to a terminal post to be fused.

37. The method of claim 36 including circulating cooling water through a cooling water circuit which passes through said coaxial coil for cooling the coaxial coil, and circulating cooling water through a second cooling circuit which includes said coil for cooling the induction heating coil.

38. The method of claim 33 including positioning said mold on said connector by straddling the mold over a portion of said connector.

39. The method of claim 33 including positioning said mold in aligned relation to the terminal post on said connector by positioning the mold opening over an integrally formed collar of the connector surrounding the connector opening.

40. The method of claim 33 including providing a locator adjacent said coil, and positioning the coil turn in predetermined spaced relation to the terminal post to be fused by moving the locator into engaging relation with the mold positioned on the connector.

41. An apparatus for fusing battery cell connectors having openings at opposite ends to battery cell terminal posts positioned in the connector openings comprising an induction heating device having a head, an induction heating coil supported by said head; said coil defining at least one annular turn; said head being selectively positionable to locate said coil turn in predetermined spaced relation to a terminal post positioned in a connector opening; a selectively energizable induction heating generator for creating a high frequency, oscillating current in said coil for melting and fusing by induction heating portions of the predetermined spaced apart terminal post and the connector; said head being disposed at the end of a flexible coaxial cable which electrically connects said coil to said generator, said coil being defined by an uninterrupted conductive tubing which defines said at least one annular turn and upstanding leg sections extending from said turn, said coil leg sections being supported and electrically connected to said coaxial cable, a cooling water supply, said coaxial cable forming part of a coaxial cable cooling water circuit communicating with said cooling water supply, cooling water supply and return lines respectively connecting said coil leg sections with said cooling water supply, and said coil and supply and return lines forming at least part of a coil cooling circuit communicating with said cooling water supply separate from said cable cooling water circuit.

* * * * *

UNITED STATES PATENT AND TRADEMARK OFFICE
CERTIFICATE OF CORRECTION

PATENT NO. : 5,834,743
DATED : November 10, 1998
INVENTOR(S) : David L. Lund and Charles J. DiMarco It is certified that error appears in the above-identified patent and that said Letters Patent is hereby corrected as shown below:

ON THE TITLE PAGE:

[73] Assignee: GNB Technologies, Inc., Mendota Heights, Minn.

Signed and Sealed this

Twenty-second Day of June, 1999

Attest:

Q. TODD DICKINSON

Attesting Officer     Acting Commissioner of Patents and Trademarks